United States Patent
Harris et al.

(10) Patent No.: US 10,784,712 B2
(45) Date of Patent: Sep. 22, 2020

(54) POWER SUPPLY RECOVERY CURRENT HISTORY-BASED LIMITATION

(71) Applicant: Microsoft Technology Licensing, LLC, Redmond, WA (US)

(72) Inventors: Shaun L. Harris, Burton, TX (US); John J. Siegler, Carnation, WA (US); Banha Sok, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 114 days.

(21) Appl. No.: 16/226,339

(22) Filed: Dec. 19, 2018

(65) Prior Publication Data

US 2019/0148975 A1   May 16, 2019

Related U.S. Application Data

(63) Continuation of application No. 15/418,688, filed on Jan. 28, 2017, now Pat. No. 10,199,860.

(51) Int. Cl.
| | |
|---|---|
| *H02J 9/06* | (2006.01) |
| *H02J 9/00* | (2006.01) |
| *H02J 9/04* | (2006.01) |
| *H02J 9/08* | (2006.01) |

(52) U.S. Cl.
CPC ............. *H02J 9/061* (2013.01); *H02J 9/00* (2013.01); *H02J 9/04* (2013.01); *H02J 9/066* (2013.01); *H02J 9/08* (2013.01); *Y02P 80/11* (2015.11)

(58) Field of Classification Search
CPC ...... H02J 9/00; H02J 9/04; H02J 9/061; H02J 9/066; H02J 9/08; Y02P 80/11
USPC ..................................................... 307/64, 66
See application file for complete search history.

(56) References Cited

U.S. PATENT DOCUMENTS

| | | |
|---|---|---|
| 5,428,524 A | 6/1995 | Massie |
| 6,118,254 A | 9/2000 | Faulk |
| 6,528,957 B1 | 3/2003 | Luchaco |
| 7,514,816 B2 | 4/2009 | Bemat et al. |
| 8,400,795 B2 | 3/2013 | Blackwell et al. |

(Continued)

OTHER PUBLICATIONS

Rasmussen, Neil, "Calculating Space and Power Density Requirements for Data Centers", in White Paper of Schneider Electric, Nov. 22, 2016, 19 pages. (copy submitted in U.S. Appl. No. 15/418,688, filed Jan. 28, 2017).

(Continued)

*Primary Examiner* — Hal Kaplan
(74) *Attorney, Agent, or Firm* — Ogilvie Law Firm

(57) ABSTRACT

A power supply unit (PSU) dynamically limits total recovery current. The PSU includes at least a power input, a power output, a historic maximum power draw memory, an update logic, and a recovery current limiting logic. Some implementations include a latest power measurement register, an hourly max power register, and a rolling max register, and controlling firmware. The update logic monitors a power level. The update logic updates the historic maximum power draw memory to match the monitored level. After a power interruption, the recovery current permitted to flow into the PSU is limited based on the historic usage. The recovery current may be limited in a constant, stepped, or ramped manner. The PSU may also provide power distribution. Multiple PSUs may be treated as a group, allowing an individual PSU to exceed its historic usage while the group's recovery currents are limited to the sum of historic usage levels.

20 Claims, 6 Drawing Sheets

(56) References Cited

U.S. PATENT DOCUMENTS

| | | | |
|---|---|---|---|
| 8,533,514 | B2 | 9/2013 | Rogers et al. |
| 8,934,209 | B2 | 1/2015 | Mistry et al. |
| 8,949,646 | B1 | 2/2015 | Weber et al. |
| 9,098,276 | B2 | 8/2015 | Humphrey et al. |
| 9,240,687 | B2 | 1/2016 | Carralero et al. |
| 2003/0080624 | A1 | 5/2003 | Belson et al. |
| 2004/0054938 | A1 | 3/2004 | Belady et al. |
| 2005/0127884 | A1 | 6/2005 | Harris et al. |
| 2006/0187646 | A1 | 8/2006 | Belson et al. |
| 2007/0278020 | A1 | 12/2007 | Harris et al. |
| 2007/0291519 | A9 | 12/2007 | Sadler et al. |
| 2009/0138733 | A1 | 5/2009 | Winick et al. |
| 2011/0245988 | A1 | 10/2011 | Ingels et al. |
| 2011/0296225 | A1 | 12/2011 | Belady et al. |
| 2011/0316338 | A1 | 12/2011 | Peterson et al. |
| 2014/0156100 | A1 | 6/2014 | El-essawy et al. |
| 2015/0214771 | A1 | 7/2015 | Peterson et al. |
| 2015/0227181 | A1 | 8/2015 | Khessib et al. |
| 2015/0372538 | A1 | 12/2015 | Siegler et al. |
| 2016/0125958 | A1 | 5/2016 | Caulfield et al. |

OTHER PUBLICATIONS

"Mains failure alarm circuit", from <<http://www.circuitstoday.com/mains-failure-alarm-circuit>>, Mar. 8, 2012, 6 pages. (copy submitted in U.S. Appl. No. 15/418,688, filed Jan. 28, 2017).

"How can I detect a power outage with a microcontroller?", from <<http://electronics.stackexchange.com/questions/17008/how-can-i-detect-a-power-outage-with-a-microcontroller>>, Jul. 15, 2012, 2 pages. (copy submitted in U.S. Appl. No. 15/418,688, filed Jan. 28, 2017).

"Current limiting", from <<https://en.wikipedia.org/wiki/Current_limiting>>, Nov. 14, 2016, 4 pages. (copy submitted in U.S. Appl. No. 15/418,688, filed Jan. 28, 2017).

"How to Measure Voltage, Current, and Power", from <<http://www.ni.com/white-paper/8198/en/>>, Jan. 7, 2016, 11 pages. (copy submitted in U.S. Appl. No. 15/418,688, filed Jan. 28, 2017).

"Uninterruptible power supply", from <<https://en.wikipedia.org/wiki/Uninterruptible_power supply>>, Dec. 21, 2016, 8 pages. (copy submitted in U.S. Appl. No. 15/418,688, filed Jan. 28, 2017).

"12G Power Supply firmware updates do not update to latest version", from <<http://www.dell.com/support/article/us/en/19/SLN294247/EN>>, Jul. 27, 2016, 3 pages. (copy submitted in U.S. Appl. No. 15/418,688, filed Jan. 28, 2017).

"Industrial Uninterruptible Pwer Supply Firmware", from <<http://www.panduit.com/wcs/Satellite?c=pg_Document_C&childpagename=Panduit_Glob>>, no later than Jan. 13, 2017, 1 page. (copy submitted in U.S. Appl. No. 15/418,688, filed Jan. 28, 2017).

"N+1 redundancy", from <<https://en.wikipedia.org/wiki/N%2B1_redundancy>>, Jul. 25, 2016, 2 pages. (copy submitted in U.S. Appl. No. 15/418,688, filed Jan. 28, 2017).

"Inrush current", from <<https://en.wikipedia.org/wiki/Inrush_current>>, Jul. 14, 2016, 3 pages. (copy submitted in U.S. Appl. No. 15/418,688, filed Jan. 28, 2017).

"Flextronics power firmware causes server to shutdown", from <<http://en.community.dell.com/techcenter/systems-management/f/4494/t/19648168>>, Aug. 13, 2015, 3 pages. (copy submitted in U.S. Appl. No. 15/418,688, filed Jan. 28, 2017).

"Design Services", from >>https://www.artesyn.com/power/product/design-services>>, no later than Jan. 14, 2017, 3 pages. (copy submitted in U.S. Appl. No. 15/418,688, filed Jan. 28, 2017).

"Power supply unit (computer)", from <<https://en.wikipedia.org/wiki/Power_supply_unit_(computer)>>, Jan. 9, 2017, 16 pages. (copy submitted in U.S. Appl. No. 15/418,688, filed Jan. 28, 2017).

"Power supply", from <<https://en.wikipedia.org/wiki/Power_supply>>, Nov. 30, 2016, 9 pages. (copy submitted in U.S. Appl. No. 15/418,688, filed Jan. 28, 2017).

"Transfer switch", from <<https://en.wikipedia.org/wiki/Transfer_switch>>, Jan. 10, 2017, 3 pages. (copy submitted in U.S. Appl. No. 15/418,688, filed Jan. 28, 2017).

"Power distribution unit", from >>https://en.wikipedia.org/wiki/Power_distribution_unit>>, Dec. 29, 2016, 3 pages. (copy submitted in U.S. Appl. No. 15/418,688, filed Jan. 28, 2017).

"Data Center", from <<http://www.geindustrial.com/industries/data-center>>, no later than Jan. 14, 2017, 2 pages. (copy submitted in U.S. Appl. No. 15/418,688, filed Jan. 28, 2017).

"What is Power Line Communication?", from <<http://www.embedded.com/print/4218852>>, Aug. 17, 2011, 17 pages. (copy submitted in U.S. Appl. No. 15/418,688, filed Jan. 28, 2017).

"PDU Installation Options", from <<https://www.tripplite.com/products/pduinstallation>>, no later than Jan. 14, 2017, 8 pages. (copy submitted in U.S. Appl. No. 15/418,688, filed Jan. 28, 2017).

Pelley, et al., "Power Routing: Dynamic Power Provisioning in the Data Center", from <<http://seelab.ucsd.edu/virtualefficiency/related_papers/24_p231-pelley.pdf>>, 2010, 12 pages. (copy submitted in U.S. Appl. No. 15/418,688, filed Jan. 28, 2017).

Wu, et al., "Dynamo: Facebook's Data Center-Wide Power Management System", from <<https://web.eecs.umich.edu/~hsuch/downloads/papers/pdfs/wu2016dynamo.pdf>>, no later than Nov. 15, 2016, 12 pages. (copy submitted in U.S. Appl. No. 15/418,688, filed Jan. 28, 2017).

POWER SUPPLY RECOVERY CURRENT HISTORY-BASED LIMITATION

RELATED APPLICATION

The present application claims priority to, is a continuation of, and hereby incorporates by reference the entirety of, U.S. patent application Ser. No. 15/418,688 filed Jan. 28, 2017.

BACKGROUND

Datacenters, factories, research facilities, and other facilities which contain electronic devices provide electrical power to those devices through a power infrastructure. The infrastructure receives power from a utility grid, or one or more local power sources, or a combination thereof. The power may be generated by solar panels, wind turbines, hydroelectric turbines, geothermal sources, nuclear reactions, fuel cells, diesel engines, or other means, alone or in combination. One or more main power sources may be supplemented by batteries, such as batteries in battery-powered uninterruptible power supplies. Power is also distributed to the electronic devices in the facility using other components, such as switches, breakers, distribution units, power supply units, and connecting lines (e.g., wires, buses, rails).

Each component of a power infrastructure has characteristics such as a maximum power capacity, and a reaction time in the event of a power surge or a power interruption. Exceeding the power capacity of a given component can damage that component and other components, and may also damage the electronic devices. In severe cases, facility personnel may be at risk. Failure to provide power from an alternate source when power is interrupted can cause loss of digital data in devices which contain volatile memory. Some examples of volatile memory include processor registers, processor caches, and random access memory commonly used by application or operating system software.

SUMMARY

Some technologies described herein are directed to the technical activity of limiting recovery current after a power interruption. Recovery current is an example of inrush current in the event of an unintended power interruption. Some of the technologies herein are directed to reducing power infrastructure cost by limiting recovery current instead of relying on the presence of a power infrastructure with enough capacity to handle full inrush currents after power interruptions. Other technical activities pertinent to teachings herein will also become apparent to those of skill in the art.

Some embodiments use or provide a power supply unit (PSU) which dynamically limits total recovery current. The PSU includes a power input, a power output, a historic maximum power draw memory, an update logic, and a recovery current limiting logic. In operation, the update logic monitors an input power level at the PSU power input, namely, a level of power drawn by the PSU from the power infrastructure. The update logic updates a value in the historic maximum power draw memory to match the monitored input power level, when the monitored input power level exceeds the historic maximum power draw memory value. After an interruption of power to the PSU, the recovery current limiting logic permits a recovery current to flow from the power infrastructure through the PSU power output while limiting the recovery current based on the historic maximum power draw memory value. The PSU may also include familiar logic, such as AC/DC conversion circuitry, noise filters, protection logics, and standby power logic, for example, and in some examples the PSU may provide power distribution functionality through multiple outputs.

Some embodiments use or provide a method of dynamically limiting total recovery current in a power infrastructure. One example includes monitoring an input power level at each of a plurality of power supply units (PSUs) which are electrically connected to the power infrastructure, and periodically calculating for each of the PSUs a historic power usage level over a recent time period which has a predetermined length. After an interruption of power to one or more of the PSUs, the method permits recovery currents to flow through the power infrastructure to recovering PSUs while limiting the recovery currents based on the respective historic power usage levels of the recovering PSUs. When multiple PSUs are treated as a group, an individual PSU may be allowed to exceed its historic usage level, but the PSUs as a group are limited so that the sum of their recovery currents does not exceed the sum of their PSU historic usage levels.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some technical concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

Figure 1:
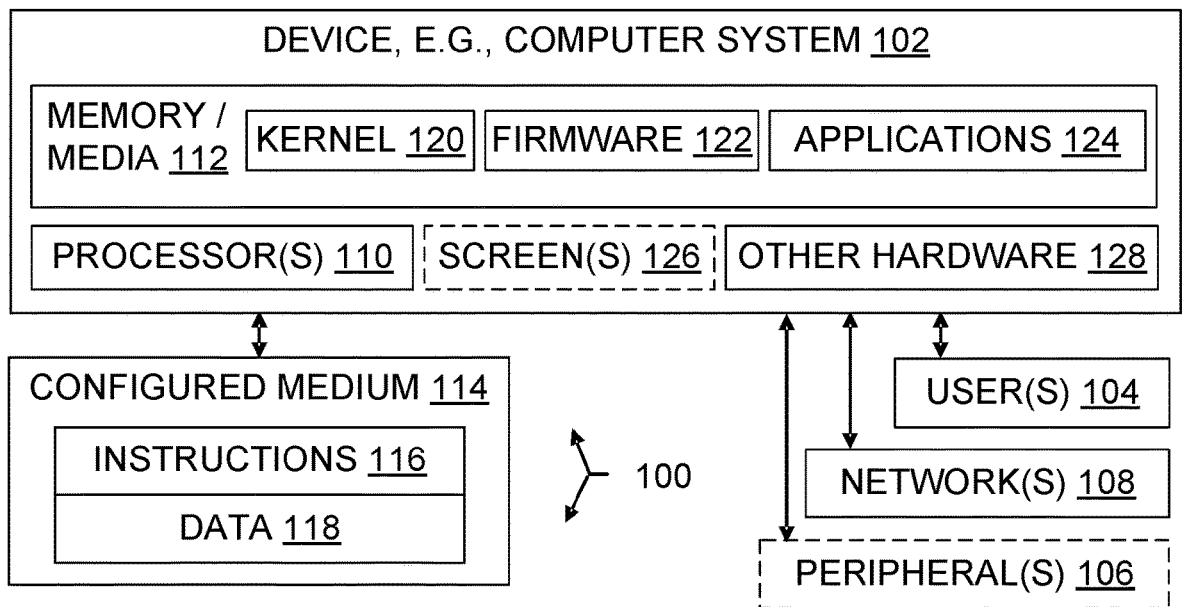
FIG. 1 is a block diagram illustrating a computer system having at least one processor and at least one memory which interact with one another under the control of software.

After a power interruption, an inrush current drawn by an electrical component may be several times the normal full load current that the component draws during normal operation. For example, when a transformer initially receives power, a transient current up to ten or fifteen times larger than the rated transformer current can flow for several cycles. Similarly, after power is interrupted, power supplies that are rated for a maximum draw may draw that maximum, or even more, for several cycles, even when their draw just prior to the interruption was significantly less their maximum rated draw, e.g., 75% or less of the maximum rated draw. Accordingly, to safely handle the inrush, power infrastructures in datacenters and other facilities are often engineered with enough capacity to handle at least their connected power supplies' maximum rated draw after power interruptions. However, over-designing the electrical infrastructure in this way to handle the maximum input recovery power the PSUs could draw can be very costly. It may also cause problems with UPS systems and the facility's internal power grid.

Some approaches described here allow a power supply to vary its maximum input recovery current depending on historical and present output loading. This may be particularly beneficial in datacenters with a large number (i.e., a thousand or more) of power supplies. Instead of using power supplies with a higher power capability than is needed for normal operation, the datacenter can use power supplies that adapt to a lower maximum input power depending on their present and historical loading.

For example, suppose a 1500 W power supply is chosen for a certain server but is presently supplying only 600 W. Power supplies usually have 150% input power recovery current. Thus, without the present input power limiting innovations, the infrastructure would have to handle 2250 W per power supply as the total recovery power. With the innovations, the infrastructure would only have to handle 900 W per PSU.

In some embodiments described herein, input power to a power supply is limited based on historical loading of the power supply. In some, input power is limited based on present output loading. Some embodiments support electrical infrastructure capacity reduction based on lowering maximum input power to power supplies that are connected to, or that reside within, the infrastructure. Some embodiments reduce input power drawn in reaction to a drop out (i.e., partial or full power interruption) in an N+N configuration or another redundant power supply configuration. Limiting maximum current at a power supply also provides benefits such as facilitating the use of a single inventory item (i.e., a single power supply SKU), thereby simplifying repair and replacement, as well as higher density of low-power racks on a given power infrastructure.

The present disclosure discusses various methods and architectures which limit the current or power, as well as fail-over options to allow the power supply to exceed this limit. Power supplies with this recovery current limitation capability may be used in datacenters worldwide, as well as during retrofitting of existing datacenters, as they could save significant costs when upgrading an electrical subsystem's capacity. Moreover, uses in facilities other than datacenters are also contemplated. For example, large automated manufacturing facilities in the automotive, semiconductor, pharmaceutical, and other industries also contain numerous electronic devices which can benefit from power supplies like those taught herein.

Some embodiments described herein may be viewed in a broader context. For instance, concepts such as capacity, limiting, monitoring, power level, and recovery, may be relevant to a particular embodiment. However, it does not follow from the availability of a broad context that exclusive rights are being sought herein for abstract ideas; they are not. Rather, the present disclosure is focused on providing appropriately specific embodiments whose technical effects fully or partially solve particular technical problems. Other media, systems, and methods involving capacity, limiting, monitoring, power level, or recovery are outside the present scope. Accordingly, vagueness, mere abstractness, lack of technical character, and accompanying proof problems are also avoided under a proper understanding of the present disclosure.

The technical character of embodiments described herein will be apparent to one of ordinary skill in the art, and will also be apparent in several ways to a wide range of attentive readers. First, some embodiments address technical activities that are rooted in electronics technology generally and occur in computing technology in particular, such as monitoring electric power levels to electronic devices, and using computing logic to control a power level. Second, some embodiments include technical components such as power supply logic hardware which interacts with software in a manner beyond the typical interactions within a general purpose computer. For example, some embodiments described herein utilize current usage history update logic and recovery current limiting logic. Third, technical effects and advantages provided by some embodiments include a reduction in the recovery current a power infrastructure must be able to safely carry, which tends to also reduce cost of the infrastructure. Fourth, some embodiments include technical adaptations such as one or more registers or other memory locations in a power supply circuit that are dedicated to holding present period and historic maximum power draw levels. Fifth, some embodiments modify the technical functionality of a datacenter or other facility that contains thousands of electronic device power supplies to reduce capital expenditures and improve administrative and operational efficiency by allowing widespread safe and efficient use of a given power supply inventory item even though different devices tend to have different power draw levels. Other advantages will also be apparent to one of skill from the description provided.

Acronyms and Abbreviations

Some acronyms and abbreviations are defined below. Others may be defined elsewhere herein or require no definition to be understood by one of skill.

AC: alternating current
ALU: arithmetic and logic unit
API: application program interface
APP: application
ATS: automatic transfer switch
BIOS: basic input/output system
CD: compact disc
CPU: central processing unit
DC: direct current
DIPL: dynamic input power limiting
DVD: digital versatile disk or digital video disc
FPGA: field-programmable gate array
FPU: floating point processing unit GPU: graphical processing unit
GUI: graphical user interface
HDD: hard disk drive (e.g. solid state, electromechanical, optical)
LAN: local area network
LPM: latest power measurement
MAP: maximum average power
MAX: maximum
OS: operating system
PDU: power distribution unit
PFC: power factor correction
PSU: power supply unit
RAM: random access memory
RMS: root mean square
ROM: read only memory
SKU: stock keeping unit
SNMP: simple network management protocol
UPS: uninterruptible power supply Additional Terminology Reference is made herein to exemplary embodiments such as those illustrated in the drawings, and specific language is used herein to describe the same. But alterations and further modifications of the features illustrated herein, and additional technical applications of the abstract principles illustrated by particular embodiments herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage (particularly in non-technical usage), or in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventors assert and exercise their right to their own lexicography. Quoted terms are being defined explicitly, but a term may also be defined implicitly without using quotation marks. Terms may be defined, either explicitly or implicitly, here in the Detailed Description and/or elsewhere in the application file.

As used herein, a "computer system" may include, for example, one or more servers, motherboards, processing nodes, personal computers (portable or not), and/or other device(s) providing one or more processors controlled at least in part by instructions. The instructions may be in the form of firmware or other software in memory and/or specialized circuitry. Although it may occur that many power supply embodiments connect to server computers, other embodiments may supply other computing devices. Power supplies themselves may qualify as a computing system because they contain computational logic with one or more processors and memory. Any one or more such devices may be part of a given embodiment or environment.

A "multithreaded" computer system is a computer system which supports multiple execution threads. The term "thread" should be understood to include any code capable of or subject to scheduling (and possibly to synchronization), and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread-processing unit, such as a core in a simultaneous multithreading implementation. As another example, a hyperthreaded quad core chip running two threads per core has eight logical processors. A logical processor includes hardware. The term "logical" is used to emphasize that a given chip may have one or more processors; "logical processor" and "processor" are used interchangeably herein. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, and similar hardware interface software. BIOS code and similar code such as firmware may be considered functionally part of a kernel.

"Code" means processor instructions, data (which includes constants, variables, and data structures), or both instructions and data. "Code" and "software" are used interchangeably herein. Executable code, interpreted code, and firmware are some examples of code.

"Logic" in a power supply includes computing hardware controlled by software or firmware, for example, or special-purpose hardware configured for recovery current limitation, or both. Disembodied software alone does not qualify as "logic" herein; computational processing hardware is required.

"Memory" means digital storage. Examples include, without limitation, processor registers, RAM, ROM, HDD, DVD, flash, and other digital storage, whether volatile or not, whether removable or not, and whether local to a chip, to a board, to a device, or not local.

"Optimize" means to improve, not necessarily to perfect. For example, it may be possible to make further improvements in a program or an algorithm which has been optimized.

"Program" is used broadly herein, to include applications, kernels, drivers, interrupt handlers, firmware, state machines, libraries, and other code written by programmers (who are also referred to as developers) and/or automatically generated.

"Routine" means a function, a procedure, an exception handler, an interrupt handler, or another block of instructions which receives control via a jump and a context save. A context save pushes a return address on a stack or otherwise saves the return address, and may also save register contents to be restored upon return from the routine.

"IoT" or "Internet of Things" means any networked collection of addressable embedded computing nodes. Such nodes are examples of computer systems as defined herein, but they also have at least two of the following characteristics: (a) no local human-readable display; (b) no local keyboard; (c) the primary source of input is sensors that track sources of non-linguistic data; (d) no local rotational disk storage—RAM chips or ROM chips provide the only local memory; (e) no CD or DVD drive; (f) embedment in a household appliance; (g) embedment in an implanted medical device; (h) embedment in a vehicle; (i) embedment in a process automation control system; or (j) a design focused on one of the following: environmental monitoring, civic infrastructure monitoring, industrial equipment monitoring, energy usage monitoring, human or animal health monitoring, or physical transportation system monitoring.

"Electronic device" means a physical device containing at least one of the following: processor, memory, logic circuitry, semiconductor chips, analog circuitry, hardware controlled by software, hardware which executes firmware, circuits whose normal operation requires a regulated source of electric power, one or more digital components.

As used herein, "include" allows additional elements (i.e., includes means comprises) unless otherwise stated. "Consists of" means consists essentially of, or consists entirely of. X consists essentially of Y when the non-Y part of X, if any, can be freely altered, removed, and/or added without altering the functionality of claimed embodiments so far as a claim in question is concerned.

"Process" is sometimes used herein as a term of the computing science arts, and in that technical sense encompasses resource users, namely, coroutines, threads, tasks, interrupt handlers, application processes, kernel processes, procedures, and object methods, for example. "Process" is also used herein as a patent law term of art, e.g., in describing a process claim as opposed to a system claim or an article of manufacture (configured storage medium) claim. Similarly, "method" is used herein at times as a technical term in the computing science arts (a kind of "routine") and also as a patent law term of art (a "process"). Those of skill will understand which meaning is intended in a particular instance, and will also understand that a given claimed process or method (in the patent law sense) may sometimes be implemented using one or more processes or methods (in the computing science sense). "Procedure" is used interchangeably with "process".

"Automatically" means by use of automation (e.g., general purpose computing hardware configured by software for specific operations and technical effects discussed herein), as opposed to without automation. In particular, steps performed "automatically" are not performed by hand on paper or in a person's mind, although they may be initiated by a human person or guided interactively by a human person. Automatic steps are performed with a machine in order to obtain one or more technical effects that would not be realized without the technical interactions thus provided.

One of skill understands that technical effects are the presumptive purpose of a technical embodiment. The mere fact that calculation is involved in an embodiment, for example, and that some calculations can also be performed without technical components (e.g., by paper and pencil, or even as mental steps) does not remove the presence of the technical effects or alter the concrete and technical nature of the embodiment. Operations such as computing and using multi-byte hash values in a domain which includes thousands or even millions of items identified by hashes are understood herein as requiring speed and accuracy that are not obtainable by human mental steps, in addition to their inherently digital nature. This is understood by persons of skill in the art but others may sometimes need to be informed or reminded of that fact.

"Computationally" likewise means a computing device (processor plus memory, at least) is being used, and excludes obtaining a result by mere human thought or mere human action alone. For example, doing arithmetic with a paper and pencil is not doing arithmetic computationally as understood herein. Computational results are faster, broader, deeper, more accurate, more consistent, more comprehensive, and/or otherwise provide technical effects that are beyond the scope of human performance alone. "Computational steps" are steps performed computationally. Neither "automatically" nor "computationally" necessarily means "immediately". "Computationally" and "automatically" are used interchangeably herein.

"Proactively" means without a direct request from a user. Indeed, a user may not even realize that a proactive step by an embodiment was possible until a result of the step has been presented to the user. Except as otherwise stated, any computational and/or automatic step described herein may also be done proactively.

"Linguistically" means by using a natural language or another form of communication which is often employed in face-to-face human-to-human communication. Communicating linguistically includes, for example, speaking, typing, or gesturing with one's fingers, hands, face, and/or body.

Throughout this document, use of the optional plural "(s)", "(es)", or "(ies)" means that one or more of the indicated feature is present. For example, "processor(s)" means "one or more processors" or equivalently "at least one processor".

For the purposes of United States law and practice, use of the word "step" herein, in the claims or elsewhere, is not intended to invoke means-plus-function, step-plus-function, or 35 United State Code Section 112 Sixth Paragraph/ Section 112(f) claim interpretation. Any presumption to that effect is hereby explicitly rebutted.

For the purposes of United States law and practice, the claims are not intended to invoke means-plus-function interpretation unless they use the phrase "means for". Claim language intended to be interpreted as means-plus-function language, if any, will expressly recite that intention by using the phrase "means for". When means-plus-function interpretation applies, whether by use of "means for" and/or by a court's legal construction of claim language, the means recited in the specification for a given noun or a given verb should be understood to be linked to the claim language and linked together herein by virtue of any of the following: appearance within the same block in a block diagram of the figures, denotation by the same or a similar name, denotation by the same reference numeral. For example, if a claim limitation recited a "zac widget" and that claim limitation became subject to means-plus-function interpretation, then at a minimum all structures identified anywhere in the specification in any figure block, paragraph, or example mentioning "zac widget", or tied together by any reference numeral assigned to a zac widget, would be deemed part of the structures identified in the application for zac widgets and would help define the set of equivalents for zac widget structures.

Throughout this document, unless expressly stated otherwise any reference to a step in a process presumes that the step may be performed directly by a party of interest and/or performed indirectly by the party through intervening mechanisms and/or intervening entities, and still lie within the scope of the step. That is, direct performance of the step by the party of interest is not required unless direct performance is an expressly stated requirement. For example, a step involving action by a party of interest such as activating, allowing, calculating, detecting, exceeding, failing over, limiting, monitoring, permitting, setting, staying within, supplying, switching, tracking, updating (and activates, activated, allows, allowed, etc.) with regard to an item or destination or other subject may involve intervening action such as forwarding, commanding, copying, initializing, uploading, downloading, encoding, decoding, compressing, decompressing, encrypting, decrypting, authenticating, invoking, marshalling, scheduling, and so on by some other party, yet still be understood as being performed directly by the party of interest.

Whenever reference is made to data or instructions, it is understood that these items configure a computer-readable memory and/or computer-readable storage medium, thereby transforming it to a particular article, as opposed to simply existing on paper, in a person's mind, or as a mere signal being propagated on a wire, for example. For the purposes of patent protection in the United States, a memory or other computer-readable storage medium is not a propagating signal or a carrier wave outside the scope of patentable subject matter under United States Patent and Trademark Office (USPTO) interpretation of the In re Nuijten case. No claim covers a signal per se in the United States, and any claim interpretation that asserts otherwise is unreasonable on its face. Unless expressly stated otherwise in a claim granted outside the United States, a claim does not cover a signal per se.

Moreover, notwithstanding anything apparently to the contrary elsewhere herein, a clear distinction is to be understood between (a) computer readable storage media and computer readable memory, on the one hand, and (b) transmission media, also referred to as signal media, on the other hand. A transmission medium is a propagating signal or a carrier wave computer readable medium. By contrast, computer readable storage media and computer readable memory are not propagating signal or carrier wave computer readable media. Unless expressly stated otherwise in the claim, "computer readable medium" means a computer readable storage medium, not a propagating signal per se.

An "embodiment" herein is an example. The term "embodiment" is not interchangeable with "the invention". Embodiments may freely share or borrow aspects to create other embodiments (provided the result is operable), even if a resulting combination of aspects is not explicitly described per se herein. Requiring each and every permitted combination to be explicitly described is unnecessary for one of skill in the art, and would be contrary to policies which recognize that patent specifications are written for readers who are skilled in the art. Formal combinatorial calculations and informal common intuition regarding the number of possible combinations arising from even a small number of combinable features will also indicate that a large number of aspect combinations exist for the aspects described herein. Accordingly, requiring an explicit recitation of each and every combination would be contrary to policies calling for patent specifications to be concise and for readers to be knowledgeable in the technical fields concerned.

LIST OF REFERENCE NUMERALS

The following list is provided for convenience and in support of the drawing figures and as part of the text of the specification, which describe innovations by reference to multiple items. Items not listed here may nonetheless be part of a given embodiment. For better legibility of the text, a given reference number is recited near some, but not all, recitations of the referenced item in the text. The same reference number may be used with reference to different examples or different instances of a given item. The list of reference numerals is:

- 100 operating environment
- 102 computer system
- 104 users
- 106 peripherals
- 108 network
- 110 processor
- 112 computer-readable storage medium, e.g., RAM, hard disks
- 114 removable configured computer-readable storage medium
- 116 instructions executable with processor
- 118 data
- 120 kernel
- 122 firmware
- 124 applications
- 126 display screen
- 128 other hardware
- 200 power infrastructure
- 202 connection to utility grid for receiving AC power
- 204 automatic transfer switch
- 206 generator or other local source of electric power generation
- 208 power distribution unit
- 210 uninterruptible power supply
- 212 power supply unit (conventional or innovative, depending on context)
- 214 one or more electronic devices
- 300 innovative power supply unit which contains at least update logic, recovery current limiting logic, and a historic maximum power draw memory
- 302 power supply input, e.g., connector
- 304 circuitry used in conventional power supplies
- 306 power supply output, e.g., connector
- 308 update logic
- 310 historic maximum power draw memory, e.g., register or RAM location
- 312 recovery current limiting logic
- 400 innovative power supply unit which contains at least update logic, recovery current limiting logic, a historic maximum power draw memory, a period timer, and a present period maximum power draw memory, e.g., a register or RAM location
- 402 period timer circuit
- 404 present period maximum power draw memory, e.g., a register or RAM location
- 500 datacenter
- 502 server (an example of an electronic device 214 and also an example of a system 102)

600 dynamic input power limiting flowchart for PSU 610 operation 602 step or steps (depending on implementation) of monitoring input power level and placing a measure of the input power level in a memory location 604 step or steps (depending on implementation) of updating a rolling maximum power level in memory 606 step or steps (depending on implementation) of updating a present period maximum power level in memory 608 step or steps (depending on implementation) of replacing a present period maximum power level in memory with a rolling maximum power level and then zeroing the rolling maximum power level in memory 610 innovative power supply unit which contains at least update and recovery current limiting logic utilizing three registers 612 latest power measurement (LPM) register 700 flowchart illustrating steps of processes for limiting input power level, and in particular for limiting recovery current 702 monitoring input power level(s), or alternately monitoring power supply output load power level(s)

704 calculating historic power usage over some period 706 historic power usage over some period 708 setting a length for a time period over which historic power usage is monitored or calculated 710 length of a time period over which historic power usage is monitored or calculated, e.g., 60 minutes 712 time period over which historic power usage is monitored or calculated, e.g., a particular 60-minute period 714 detecting a power interruption 716 a power interruption 718 permitting recovery current to flow through a power supply 720 flow of recovery current through a power supply 722 limiting recovery current flow based on historic power usage 724 maximum power draw of one or more PSUs 726 sum of maximum power draws exceeds a rating 728 sum of maximum power draws does not exceed a rating 730 limiting recovery current flow to a specified percentage of historic power usage; the percentage may be less than, equal to, or greater than, 100%

Figure 8:
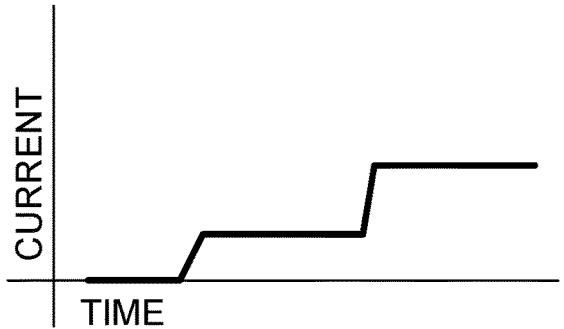
FIG. 8 illustrates power increasing over time in a stepped manner ("stepped" increasing means power increases with more time at slope zero than with slope not zero)
Figure 9:
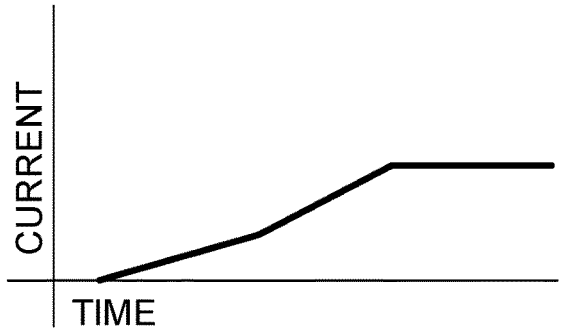
FIG. 9 illustrates power increasing over time in a ramped manner ("ramped" increasing means power increases with more time at one or more slopes above zero than with slope zero).

732 failing over from one set of power supplies to another set of power supplies 734 allowing an individual power supply to exceed its historic usage, or allowing multiple power supplies to collectively exceed the sum of their historic usages 736 limiting a sum of power supply draws based on their historic power usage 738 updating a memory which contains a value representing a power draw level 740 tracking power level within a particular time period 742 determining a present time period maximum power draw level 744 present time period maximum power draw level 746 limiting recovery current in a stepped or ramped manner; this is particular example of limiting 722 power or current 748 stepped or ramped manner, e.g., in a stepped manner as illustrated in FIG. 8 or in a ramped manner as illustrated in FIG. 9

750 limiting current through a power supply within a specified percentage of the power supply's rated power conversion efficiency; this is particular example of limiting 722 power or current 752 power supply's rated power conversion efficiency, namely output power divided by input power 754 activate limiting logic that limits power supply input current, and thus also limits the draw from the power infrastructure that supplies the input current 756 delay, e.g., in milliseconds, from when power interruption begins at the power supply to when an associated recovery current through the power supply is limited by the current limiting logic of the power supply Operating Environments With reference to FIG. 1, an operating environment 100 for an embodiment, which may be part of a cloud or datacenter or other computing facility, or part of an automated manufacturing facility, or a research facility, for example. The operating environment 100 includes at least one computer system 102. The computer system 102 may be a multiprocessor computer system, or not. An operating environment may include one or more machines in a given computer system, which may be clustered, client-server networked, and/or peer-to-peer networked within a cloud 100. An individual machine is a computer system, and a group of cooperating machines is also a computer system. A given computer system 102 may be configured for end-users, e.g., with applications, for administrators, as a server, as a distributed processing node, and/or in other ways.

Notably, innovative power supplies taught herein may not only supply power to computers systems 102 but may also themselves be computer systems 102, in that their recovery current limiting functionality may be implemented in part using computing components such as a processor 110, memory 112, and firmware 122.

Human users 104 may interact with a computer system 102 by using displays, keyboards, and other peripherals 106, via typed text, touch, voice, movement, computer vision, gestures, and/or other forms of I/O. A user interface may support interaction between an embodiment and one or more human users. A user interface may include a command line interface, a graphical user interface (GUI), natural user interface (NUI), voice command interface, and/or other user interface (UI) presentations. Natural user interface (NUI) operation may use speech recognition, touch and stylus recognition, gesture recognition both on screen and adjacent to the screen, air gestures, head and eye tracking, voice and speech, vision, touch, gestures, and/or machine intelligence, for example. A user interface may be generated on a local desktop computer, or on a smart phone, for example, or it may be generated from a web server and sent to a client.

System administrators, developers, engineers, and end-users are each a particular type of user 104. Automated agents, scripts, playback software, and the like acting on behalf of one or more people may also be users 104. Storage devices and/or networking devices may be considered peripheral equipment in some embodiments and part of a system 102 in other embodiments. Other computer systems not shown in FIG. 1 may interact in technological ways with the computer system 102 or with another system embodiment using one or more connections to a network 108 via network interface equipment, for example.

Each computer system 102 includes at least one logical processor 110. The computer system 102, like other suitable systems, also includes one or more computer-readable storage media 112. Media 112 may be of different physical types. The media 112 may be volatile memory, non-volatile memory, fixed in place media, removable media, magnetic media, optical media, solid-state media, and/or of other types of physical durable storage media (as opposed to merely a propagated signal). In particular, a configured medium 114 such as a portable (i.e., external) hard drive, CD, DVD, memory stick, or other removable non-volatile memory medium may become functionally a technological part of the computer system when inserted or otherwise installed, making its content accessible for interaction with and use by processor 110. The removable configured medium 114 is an example of a computer-readable storage medium 112. Some other examples of computer-readable storage media 112 include processor registers, processor cache, built-in RAM, ROM, hard disks, and other memory storage devices which are not readily removable by users 104. For compliance with present United States patent requirements, neither a computer-readable medium nor a computer-readable storage medium nor a computer-readable memory is a signal per se under any claim pending or granted in the United States.

The medium 114 is configured with binary instructions 116 that are executable by a processor 110; "executable" is used in a broad sense herein to include machine code, interpretable code, bytecode, and/or code that runs on a virtual machine, for example. The medium 114 is also configured with data 118 which is created, modified, referenced, and/or otherwise used for technical effect by execution of the instructions 116. The instructions 116 and the data 118 configure the memory or other storage medium 114 in which they reside; when that memory or other computer readable storage medium is a functional part of a given computer system, the instructions 116 and data 118 also configure that computer system. In some embodiments, a portion of the data 118 is representative of real-world items such as product characteristics, inventories, current levels and other physical measurements, settings, images, readings, targets, volumes, and so forth. Such data is also transformed by backup, restore, commits, aborts, reformatting, rebooting, and/or other technical operations.

One of skill will understand that when functionality is implemented in firmware or other software, the same or similar functionality can often be implemented, in whole or in part, directly in hardware logic, 128 to provide the same or similar technical effects. For example, and without excluding other implementations, an embodiment may include hardware logic components such as Field-Programmable Gate Arrays (FPGAs), Application-Specific Integrated Circuits (ASICs), Application-Specific Standard Products (ASSPs), System-on-a-Chip components (SOCs), Complex Programmable Logic Devices (CPLDs), and similar hardware logic components. Unless indicated otherwise, "firmware" herein encompasses such hardware logic components. Components of an embodiment may be grouped into interacting functional modules based on their inputs, outputs, and/or their technical effects, for example.

In addition to processors 110 (CPUs, ALUs, FPUs, and/or GPUs), memory/storage media 112, an operating environment may also include other hardware 128, such as displays 126, batteries, buses, power supplies, wired and wireless network interface cards, accelerators, racks, and network cables, for instance. A display 126 may include one or more touch screens, screens responsive to input from a pen or tablet, or screens which operate solely for output.

In some embodiments peripherals 106 such as human user I/O devices (screen, keyboard, mouse, tablet, microphone, speaker, motion sensor, etc.) will be present in operable communication with one or more processors 110 and memory. However, an embodiment may also be deeply embedded in a technical system, such as a portion of the Internet of Things or a power infrastructure or a datacenter server rack or a robotic manufacturing device, such that no human user 104 interacts directly with the embodiment. Software processes may be users 104.

In some embodiments, the system includes multiple computers connected by a network 108. Networking interface equipment can provide access to networks 108, using components such as a packet-switched network interface card, a wireless transceiver, or a telephone network interface, for example, which may be present in a given computer system. However, an embodiment may also communicate technical data and/or technical instructions through direct memory access, removable nonvolatile media, or other information storage-retrieval and/or transmission approaches.

The kernel 120, firmware 122, applications 124, and other items shown in the Figures and/or discussed in the text, may each reside partially or entirely within one or more hardware media 112, thereby configuring those media for technical effects which go beyond the "normal" (i.e., least common denominator) interactions inherent in all hardware—software cooperative operation.

In some embodiments, the computing system 102 powered through an innovative power supply includes at least one of the following: a server computer, a cloud server, a datacenter server, a server configured to run multiple virtual machines, a smartphone, a tablet, a laptop, a desktop, a workstation, a video gaming system, a virtual reality system, an augmented reality system, a vehicle, an automated manufacturing system, a process control system, a robotic system, an embedded system.

One of skill will appreciate that the foregoing aspects and other aspects presented herein under "Operating Environments" may form part of a given embodiment. This document's headings are not intended to provide a strict classification of features into embodiment and non-embodiment feature sets.

One or more items are shown in outline or dashed form in the Figures, to emphasize that they are not necessarily part of the illustrated operating environment or all embodiments, but may interoperate with items in the operating environment or some embodiments as discussed herein. It does not follow that items not in outline or parenthetical form are necessarily required, in any Figure or any embodiment. In particular, FIG. 1 is provided for convenience; inclusion of an item in FIG. 1 does not imply that the item, or the described use of the item, was known prior to the present innovations.

Items in dashed outline form, such as peripherals 106 and screens 126, may or may not be physically present in a given embodiment, individually or in any operable combination. Items may sometimes be physically present but not be used by a particular embodiment.

Power Infrastructures, Power Supplies, Powered Devices

Figure 2:
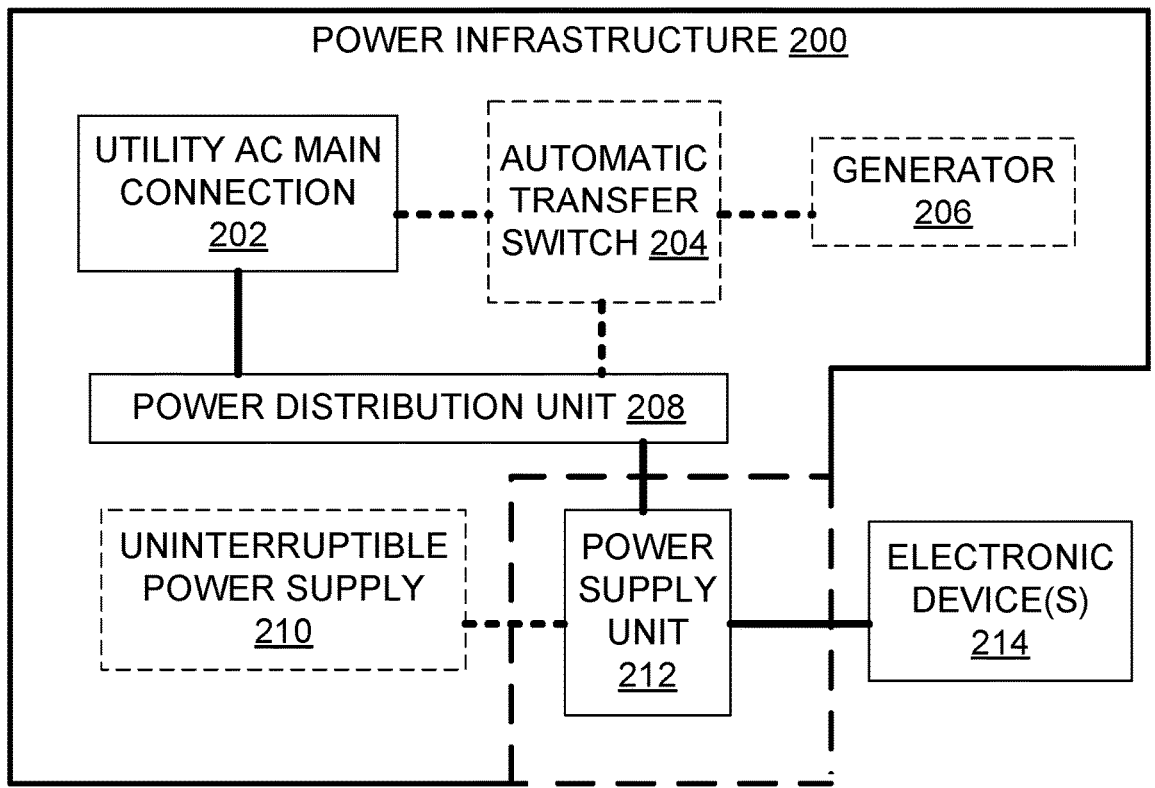
FIG. 2 is a block diagram illustrating aspects of a power infrastructure.
Figure 5:
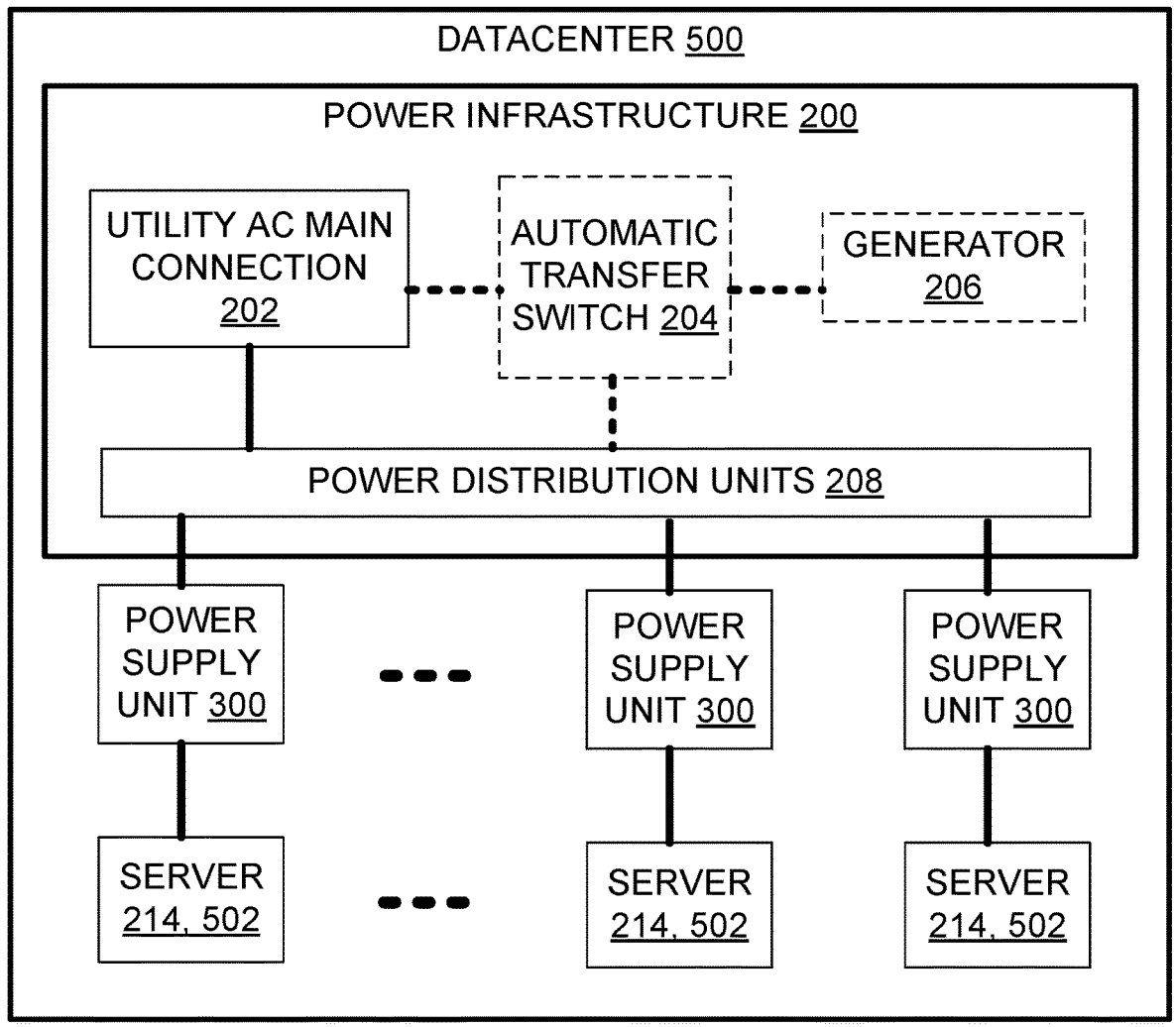
FIG. 5 is a diagram illustrating aspects of a datacenter, including a power infrastructure and server computers.

FIGS. 2 and 5 illustrate aspects of power infrastructures suitable for use with innovative power supplies taught herein. In many situations, a power infrastructure 200 includes a connection 202 to a utility grid, but some power infrastructures are "off the grid" in that they have one or more separate local sources of power 206 which are used for normal operation. Some power infrastructures 200 have local sources of power such as generators 206 that are used mostly or only when power is not available from the utility grid. Switching from the grid connection 202 to the local generator 206 is sometimes referred to as "failover" and may be accomplished using an automatic transfer switch 204. In addition to automatically switching the load from the grid to the backup generator (or from one set of backup generators to another power source), the automatic transfer switch 204 may monitor voltages and may start the generator or make other preparations to be ready in case a switch in power sources is needed. The automatic transfer switch 204 may include any suitable familiar automatic transfer switch, for example.

The illustrated infrastructures also include one or more power distribution units 208, although only one PDU 208 is expressly shown, for clarity of the figures. A power distribution unit 208 distributes power to multiple outputs. Many familiar power distribution units also perform other functions, such as power filtering to improve power quality, load balancing between outputs, supporting remote monitoring using a LAN or SNMP, and breaking a load circuit for surge protection. Any of the functionality of a power distribution unit 208 may be incorporated in a power supply unit 212 as taught herein, to supplement the innovative current limiting functionality described herein.

As illustrated in FIG. 2, a power infrastructure 200 may also contain one or more uninterruptible power supplies 210. An uninterruptible power supply 210 is a power supply 212 which provides battery backup power when a regular power source fails. Some uninterruptible power supplies 210 also provide supplemental power when the regular power source is inadequate but has not entirely failed. Some familiar kinds of uninterruptible power supplies 210 include offline or standby devices which provide battery backup and surge protection, line-interactive devices which can tolerate undervoltage and overvoltage conditions without consuming their battery power, and online or double-conversion devices which firewall (i.e., protect) the load using a rectifier in the load circuit. Any of the functionality of an uninterruptible power supply may be incorporated in a power supply unit 212 as taught herein, to supplement the innovative current limiting functionality described herein.

The Figures use reference numeral 212 to designate familiar power supplies and also use 212 to designate innovative current limiting power supplies taught herein. This overlap indicates that circuits used in a conventional power supply 212 could also be used in an innovative power supply 212 of the same rating, for their familiar functionality, but would be supplemented with current or power limiting functionality logic taught herein. The reference numerals 300, 400, and 610 are reserved herein for innovative power supplies. Thus, every power supply 300, every power supply 400, and every power supply 610 is an example of the general category 212 of power supplies, but not every power supply 212 is an innovative power supply 300 or an innovative power supply 400 or an innovative power supply 610.

As indicated by the dashed lines in FIG. 2, the power supply 212 may be considered part of the power infrastructure, or may alternately be considered not part of the power infrastructure but electrically connected to the infrastructure. The language used distinguishes these situations. For example, if a claim recites language along the lines of "a power infrastructure including a power supply" then the power supply is both part of the power infrastructure and electrically connected to the power infrastructure. By contrast, when a claim recites language along the lines of "a power infrastructure, and a power supply connected to the power infrastructure" then the power supply is not part of the power infrastructure but is electrically connected to the power infrastructure. Requirements such as written description and enablement pertain to the claimed subject matter, not to subject matter that is provided merely for context and is not claimed. For example, consider a claim that is directed to a power supply which draws power from a power infrastructure, and assume the claim does not also recite the power infrastructure as an element. Such a claim is directed to the power supply, not to the power supply in combination with the power infrastructure; in such a claim, the power infrastructure is mentioned merely for context and is not itself claimed.

As illustrated in FIGS. 2 and 5, the power supply units supply electrical power to electronic devices 214. This may be done in a datacenter 500 or other facility which includes thousands or even tens of thousands of electronic devices 214 powered by the power supplies. Server computers 502 are one example of such electronic devices 214, but many other examples are possible, including without limitation robots, pharmaceutical processing equipment, automotive manufacturing equipment, semiconductor fabrication equipment, camera networks, aeronautics equipment for air traffic control, medical equipment in a hospital, radio or television or internet transmission equipment, and so on.

Innovative Power Supply Units

Figure 3:
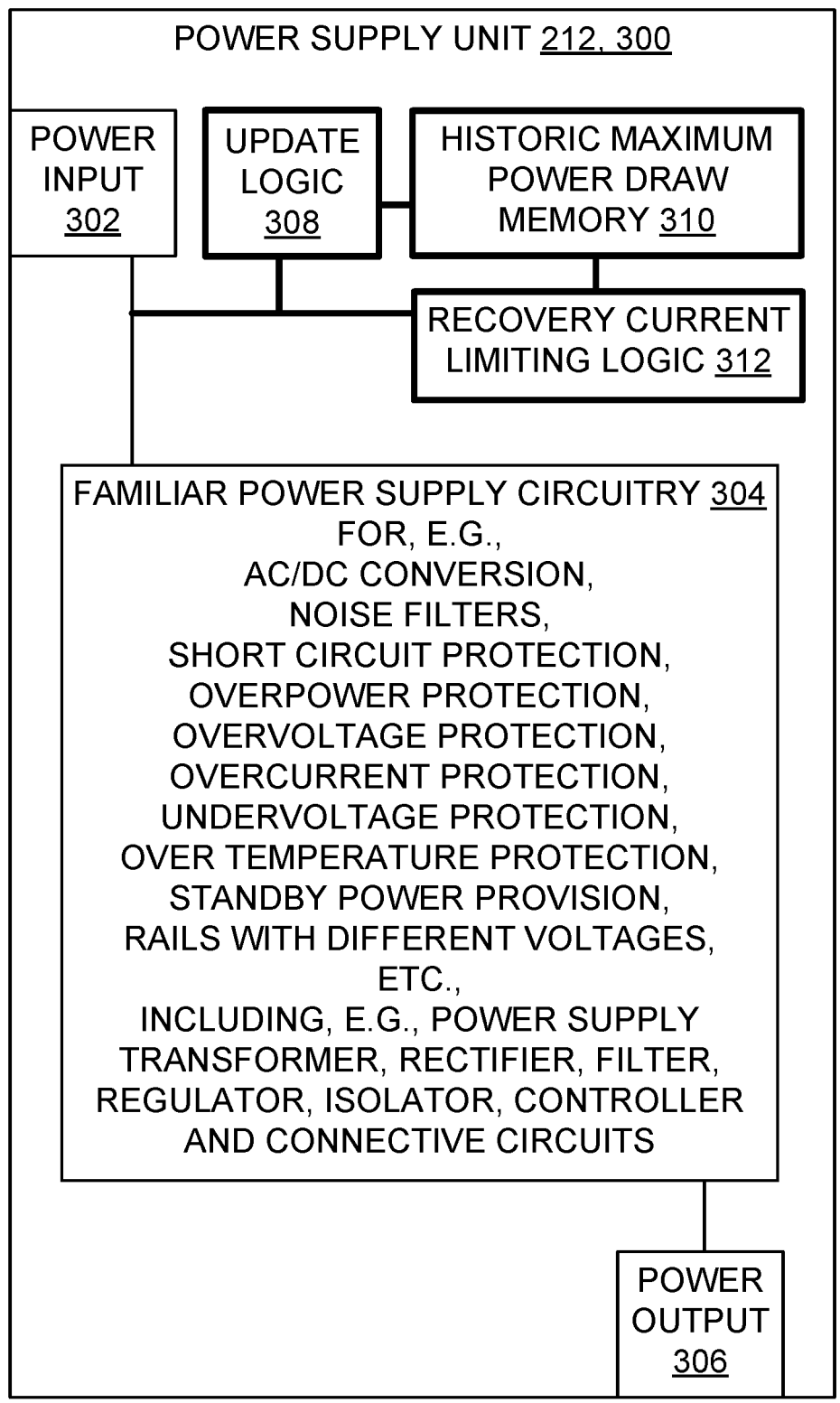
FIG. 3 is a block diagram illustrating aspects of a power supply unit.
Figure 4:
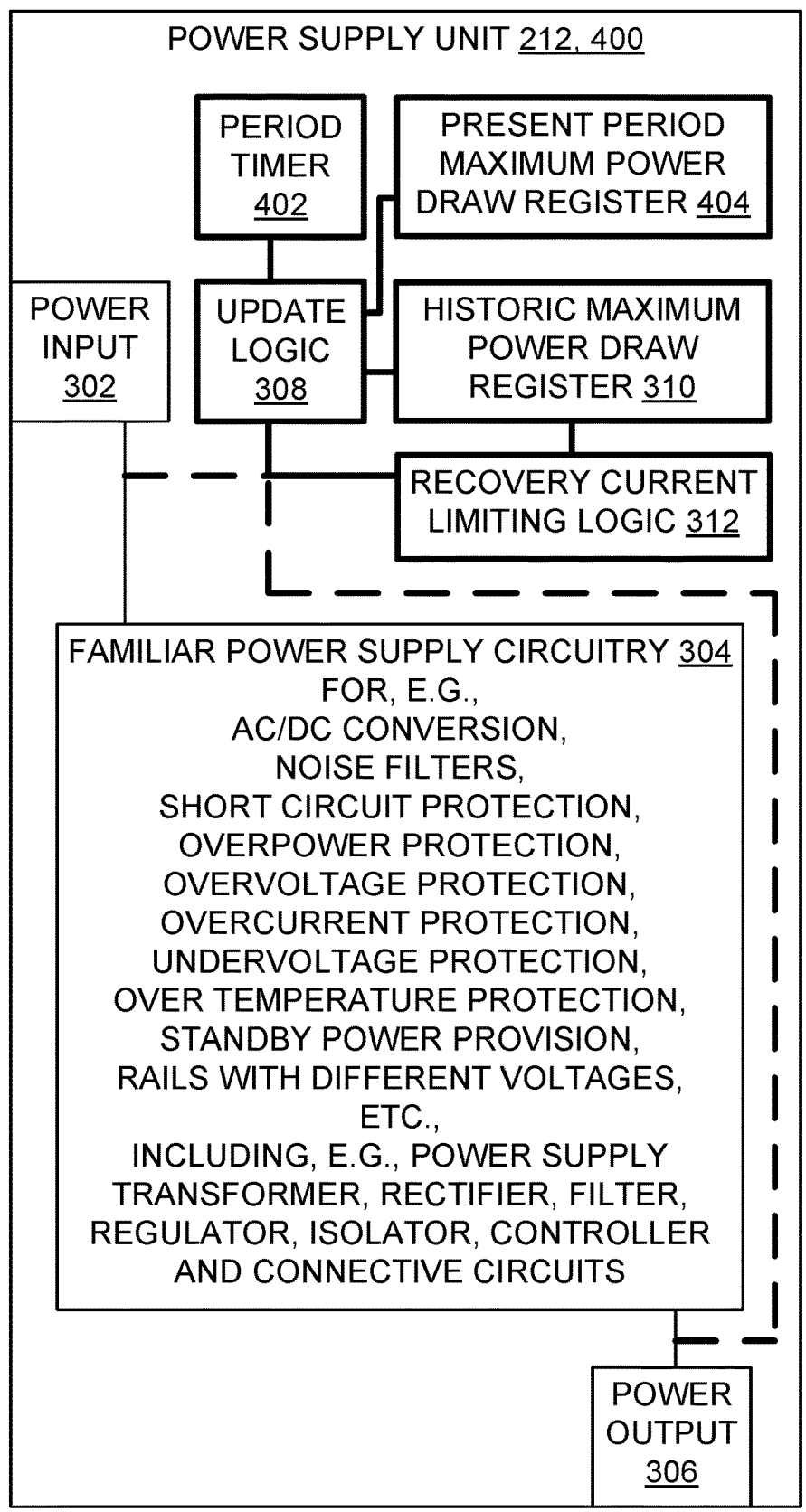
FIG. 4 is a block diagram illustrating aspects of another power supply unit.

FIGS. 3 and 4 illustrate some innovative power supply units, designated by reference numerals 300 and 400, respectively. Power supply unit 300 includes a power input 302, familiar power supply circuitry 304, a power output 306, and additional components, namely, update logic 308, historic power draw memory 310, and recovery current limiting logic 312.

Power supply unit 400 includes the same components as power supply unit 300, plus a period timer 402 and present period maximum power draw memory 404. FIG. 4 also differs from FIG. 3 in that, for more diverse illustration, the memory components 310 and 404 in FIG. 4 are listed as registers. Processor registers and standalone registers are each one kind of memory; RAM modules are another kind of memory. Embodiments are not necessarily limited to use of registers as maximum power draw memories.

In addition, dashed lines in FIG. 4 illustrate the options of monitoring either at the input 302 or at the output 306, or both, in order to obtain the historic usage data upon which recovery current limitation is based. Similar monitoring options exist in versions of PSU 300 and PSU 610, but for clarity of illustration these monitoring options are not expressly called out in FIG. 3 or FIG. 6.

In the illustrated examples, familiar power supply circuitry 304 may include circuitry for, e.g., AC/DC conversion, noise filters, short circuit protection, overpower protection, overvoltage protection, overcurrent protection, undervoltage protection, over temperature protection, standby power provision, and rails with different voltages. These circuits 304 may be implemented using, for example, one or more power supply transformers, rectifiers, filters, regulators, isolators, controllers, and connective circuits. Suitable circuits 304 are well understood and readily implemented by one of skill in the art of power supply engineering.

In some of these examples, update logic 308 includes circuitry which monitors the power input level and updates 738 the historic maximum power draw memory 310 when the monitored power input level exceeds the current value in the historic maximum power draw memory 310. Monitoring circuitry may be adapted, e.g., from familiar circuits in power, voltage, or current measurement tools using, e.g., shunts, current transformers, potential transformers, Hall-effect sensors, Rogowski coils, and measurement sensors.

Memory updates 738 may be implemented using, e.g., comparators, timing circuits, data buses, and memory devices such as registers.

In some examples, recovery current limiting logic 312 includes circuitry which detects a power interruption and limits current after the power interruption. Logic 312 for detecting power interruption may be adapted, e.g., from familiar power outage detection circuits, such as those used in uninterruptible power supplies 210, automatic transfer switches 204, and other devices, and may be implemented using items such as reference signals, optocouplers, zero-crossing detection circuits, transformers, capacitors, and transistors, for example. Logic 312 for limiting current may be adapted, e.g., from familiar current limiting circuits, such as those used for overcurrent protection, and may be implemented using items such as negative temperature coefficient thermistors, resisters, and transistors, for example.

In some examples, period timer 402 includes a timer circuit which triggers a signal and resets to zero after a specified elapsed time, and which is resettable to set the timer's elapsed time back to zero. Timer 402 maybe implemented using a counter, for example. Familiar timer circuits may also be adapted for use as taught herein.

Some embodiments use or provide a power supply unit (PSU) 300 which dynamically limits total recovery current. The PSU 300 includes a power input 302, a power output 306, a historic maximum power draw memory 310, an update logic 308, and a recovery current limiting logic 312. In operation, the update logic 308 monitors an input power level at the PSU power input, namely, a level of power drawn by the PSU from a power infrastructure. In operation, the update logic 308 updates 738 a value in the historic maximum power draw memory 310 to match the monitored input power level when the monitored input power level exceeds the historic maximum power draw memory value. In operation, after an interruption of power to the PSU the recovery current limiting logic 312 permits a recovery current to flow from the power infrastructure through the PSU power output while limiting the recovery current based on the historic maximum power draw memory value.

In some examples, the update logic 308 tracks 740 the input power level at the PSU power input within a given time period, thereby determining 742 a present period maximum power draw value 744. When the present period maximum power draw value is less than the historic maximum power draw memory value for a given period, the update logic lowers the historic maximum power draw memory value to match the present period maximum power draw value.

In some examples, the power supply unit 300 has a rated maximum draw M, and a conversion efficiency E 752. In such cases, the historic maximum power draw memory value may be such that the recovery current limiting logic limits 750 the recovery current flowing through the power output to a value that is no greater than 70 percent of M times E.

In some examples, multiple power supply units 300 are present. Each power supply unit 300 has a respective power input 302, power output 306, historic maximum power draw memory 310, update logic 308, and recovery current limiting logic 312. In some cases, the power supply units draw power from a power infrastructure 200 which has a maximum rated capacity, and each power supply unit 300 has a respective rated maximum draw, and the sum of the power supply unit rated maximum draws exceeds the maximum rated capacity of the power infrastructure. However, the sum of the power amounts actually drawn when each power supply unit limits recovery current based on its respective historic maximum power draw memory value does not exceed the maximum rated capacity of the power infrastructure.

In some examples, the recovery current limiting logic 312 is activated 754 in the power supply unit and the limited recovery current begins to flow quickly enough after the interruption of power starts to prevent a loss of data in a digital device 214 that is powered by the power supply unit.

In some examples, the recovery current limiting logic 312 permits limited 746 recovery current to flow from the power infrastructure through the PSU 300 in a stepped manner 748 as illustrated, e.g., in FIG. 8. More generally, power flowing in a stepped manner generally means that power flows at a first power rate for a first time period and then at a second and greater power rate for a subsequent second time period. In some examples, recovery power is limited instead in a constant manner or a ramped manner.

Some embodiments use or provide a power supply system 102 which dynamically limits total recovery current. The power supply system 102 includes at least one power supply unit (PSU) 400, with the PSU 400 including a power input 302, a power output 306, a resettable period timer 402 having a full period of predetermined length, a historic maximum power draw register 310 which in operation represents the maximum power drawn by the PSU from a power infrastructure during a recent period, and a present period maximum power draw register 404 which in operation represents the maximum power drawn by the PSU from the power infrastructure after a most recent update to the historic maximum power draw register. Each PSU 400 also includes one or more register update logics 308 which in operation (a) collectively monitor an input power level at the PSU, and update the present period maximum power draw register based on the monitored input power level, (b) update the historic maximum power draw register to match the monitored input power level and reset the period timer when the monitored input power level exceeds the historic maximum power draw register, and (c) reset the period timer and update the historic maximum power draw register to match the present period maximum power draw register after the historic maximum power draw register exceeds the present period maximum power draw register. Each PSU 400 also includes a recovery current limiting logic 312 which in operation after an interruption of power to the PSU permits a recovery current to flow from the power infrastructure through the PSU while limiting the recovery current based on the historic maximum power draw register.

In some examples, the PSU 400 is configured to operate differently depending on the length of the power interruption, in that the recovery current limiting logic 312 operates when the length of the power interruption is less than a predetermined value X, but when the length of the power interruption is greater than X the PSU performs a soft start without operating the recovery current limiting logic. X may be, for example, the time needed for an automatic transfer switch 204 to switch from the main connection 202 to the generator 206. Alternately, X may be the time after which a digital device's volatile memory will lose data when it lacks power. In a datacenter 500, X may be in the range from about 10 to about 20 milliseconds. In some environments, X is under 100 milliseconds, and a power supply unit soft start or reboot takes well over 100 milliseconds to complete.

In some examples, the recovery current limiting logic 312 is activated 754 in the PSU 400 only when the interruption of power to the PSU lasts for less than X milliseconds, where X is a value such that the power system can switch from main power to battery power through the PSU in less than X milliseconds without causing a loss of data in a digital device that is powered by the PSU. In some examples, the current limiting logic 312 is activated 754 upon booting the power supply unit.

In some examples, the recovery current limiting logic 312 begins permitting the limited recovery current to flow from the power infrastructure through the PSU 400 within a delay 756 of less than 100 milliseconds after the interruption of power begins.

In some examples, the recovery current limiting logic 312 permits limited 746 recovery current to flow from the power infrastructure through the PSU at a plurality of ramped 748 power rates as illustrated, e.g., in FIG. 9. More generally, power flowing at a plurality of ramped power rates means that power flows at more than one rate, and does not necessarily imply that the power rate is linear or imply the number of slopes present if the power rate is linear.

In some examples, the power supply system includes at least ten thousand PSUs 400. Each PSU 400 includes a respective resettable period timer 402, a respective historic maximum power draw register 310, a respective present period maximum power draw register 404, one or more respective register update logics 308, and a respective recovery current limiting logic 312.

In some examples, the power supply system 102 includes the power infrastructure 200, the power infrastructure provides power to servers 502 in at least a portion of a datacenter 500, and the power supply system 102 includes at least one thousand PSUs 400 that are connected to the power infrastructure to power the servers 502. Each PSU 400 includes a respective resettable period timer 402, a respective historic maximum power draw register 310, a respective present period maximum power draw register 404, one or more respective register update logics 308, and a respective recovery current limiting logic 312.

Three-Register Example

Figure 6:
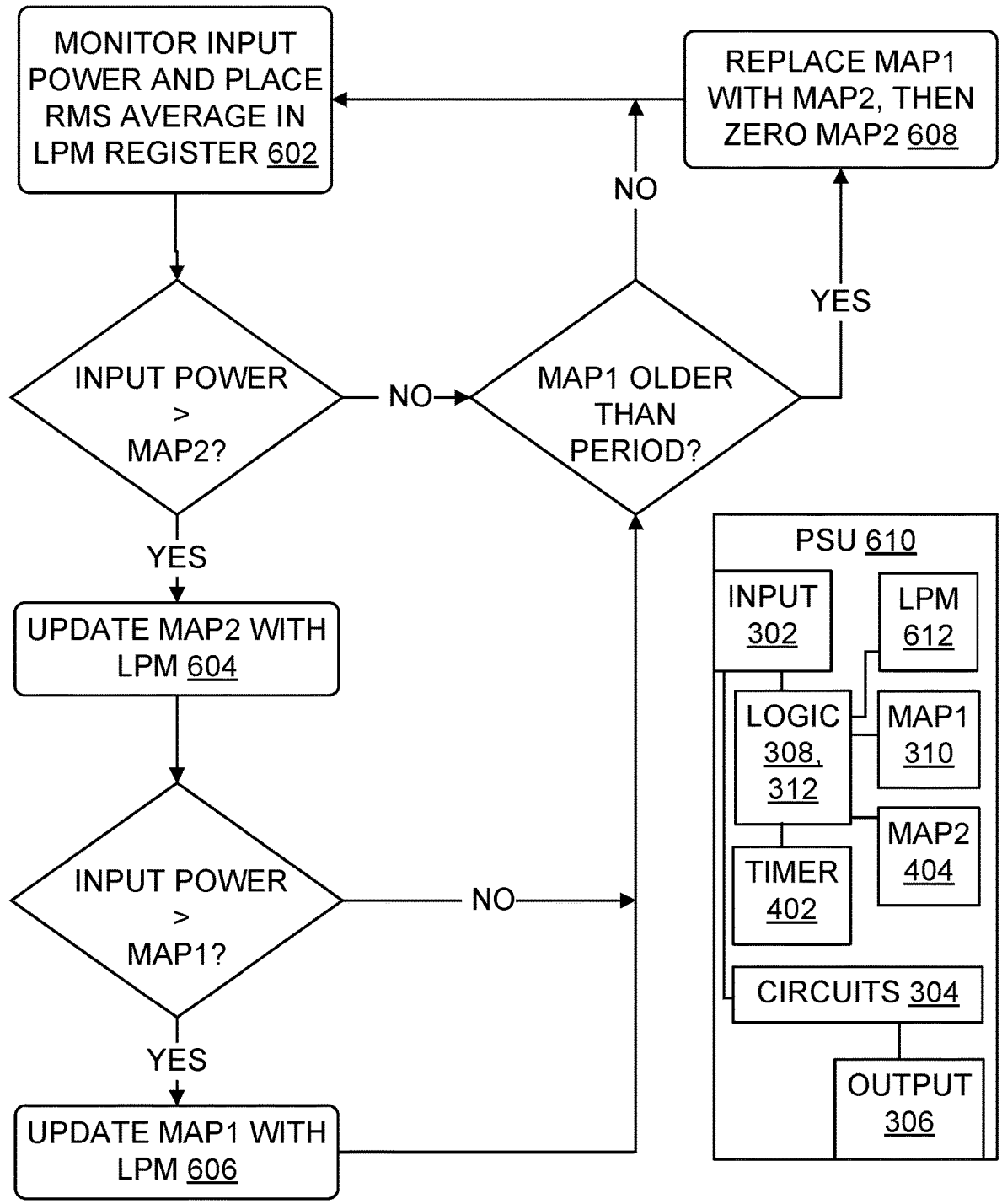
FIG. 6 is a flowchart illustrating an example implementation of dynamic input power limiting (DIPL) technology, together with a schematic of a power supply unit which operates according to the flowchart.

FIG. 6 illustrates aspects of a three-register example of an innovative power supply unit 610, including a flowchart 600 illustrating operation of the PSU 610 and a block diagram illustrating architectural components of the PSU 610. The PSU 610 may also be understood as a particular example of the group of PSUs 400, which in turn may be understood as a sub-category of PSUs 300.

As indicated by the block diagram in the lower right corner of FIG. 6, the PSU 610 includes at least three registers: a MAP1 register which can be characterized as an example of a historic maximum power draw memory 310, a MAP2 register which can be characterized as an example of a present period maximum power draw memory 404, and an LPM register 612. The registers are not necessarily located in a processor 110, but are in operable communication with a processor 110, i.e., they can be read and written by execution of processor instructions. MAP is an acronym for Maximum Average Power, and LPM is an acronym for Latest Power Measurement.

One of skill will understand the operation of PSU 610 from flowchart 600 and the present discussion, e.g., it will be understood that in this particular example PSU 610 will use the value MAP1*140% to set a maximum input current. In related examples, maximum input current is limited to a different percentage of the MAP1 value. If the input power does not exceed this maximum for sixty minutes, MAP1 is lowered to the highest power in the last sixty minutes. If LPM exceeds MAP1, this value is loaded immediately into MAP1 and a sixty minute counter 402 is reset.

In the operation of this particular PSU 610, the timer 402 uses a period of sixty minutes, the update logic checks input power level every one hundred milliseconds, and the current limiting logic uses 140% as a factor for determining maximum permitted recovery current. In other examples, different values may be used. For instance, the time period may be in the range from thirty minutes to ninety minutes, the input power level may be checked periodically with a period in the range from twenty milliseconds to one-hundred fifty milliseconds, and the current limiting factor may be in the range from 130% to 160%.

In this example, the MAP1 register stores the maximum power measured in the last 60 minutes, and so may be labeled the "hourly max" register. At boot up of the PSU 610, MAP1 is set to 140% of the maximum output rating for the PSU 610. The MAP2 register stores the maximum power measured since MAP1 was updated, and so may be labeled the "rolling max" register. At boot up of the PSU 610, MAP2 is set to zero. The LPM register stores the current power measured over the last 100 ms and so may be labeled the "latest measurement" register. LPM may be initialized to zero at boot up.

In operation, at step 602 the logic monitors the input power over 100 ms and places an average (e.g., root mean square) of that value in the LPM register. Then comparison logic checks whether the measured input power LPM is greater than the rolling max MAP2. If so, at step 604 MAP2 is given the LPM value. Then comparison logic checks whether the measured input power LPM is greater than the hourly max MAP1. If so, at step 606 MAP1 is also given the LPM value. On other branches, if either comparison determines the latest measurement is not greater than the hourly max or rolling max, then that max is not updated. However, elapsed time is tested to see if the hourly max value is more than one hour old. If it is, then at step 608 the hourly max is updated to the present rolling max and the rolling max is zeroed.

In this example, power supply unit 610 has a power factor correction (PFC) set to 140% of the hourly max MAP1 value. The PFC indicates the maximum input power permitted by the limiting logic 312 of PSU 610.

Although some examples herein speak of power and some speak in terms of current, one of skill understands that power and current are related by Ohm's Law, which states that Power (in watts) equals Voltage (in volts) times Current (in amperes). Accordingly, for present purposes limiting power is equivalent to limiting current, and limiting current is equivalent to limiting power. Either limitation permits a power infrastructure to have less recovery current capacity than would otherwise be needed, for instance.

In some examples, present input power level (IPL) setting is reported to a rack manager or row manager in a datacenter, where some of the logic 308, 312 resides. In some examples, the power supply has circuitry to provide such functionality using a digital PFC chip, and input current and voltage are monitored.

DIPL Scenario

DIPL (dynamic input power limits) benefits will be apparent from the foregoing to one of skill. As further illustration, however, the following scenario is presented involving dynamic adaptable input power supply power limits for datacenters. Assume there are 180 racks in a datacenter, which share 2 MW of infrastructure capacity. Assume a maximum server blade input power is 680 W/0.92=740 W, and that for a fully loaded unit, maximum blades per rack is 11000 W/740 W=14.88=14. For a lighter loaded unit assume 300 W per blade=300 W/0.93=323 W input power. Then maximum blades per rack is 11000 W/323 W=34 Blades.

To find the max input current draw without DIPL, assume the maximum power supply dynamic input current is 140% of full load. A PSU 212 max input current will be 1.4*1020/0.92=1552 W. In the fully loaded power blade unit, a 2MW stamp (2 MW group of racks) after a 20 ms drop out will be subjected to: 14 blades/rack*180 racks*1552 W/blade=3.91 MW. For the 300 W unit, after a 20 ms drop out, the stamp can be subjected to 34 blades/rack*180 racks*1552 W=9.5MW. Conventionally, a 2MW stamp would be overdesigned to handle either case, including the fully loaded blade deployment.

But using dynamic input power limit technology as taught herein, the PSU monitors input power or current and sets input power limit to be 140% of maximum input current measured over the previous sixty minutes. A drop out will thus result in a maximum of 140% of the current server load. As a result, the stamp's power infrastructure need not have as high a capacity as would be needed without the DIPL technology. The exact savings depends on actual (or anticipated) historic usage, but can be significant.

Processes

Figure 7:
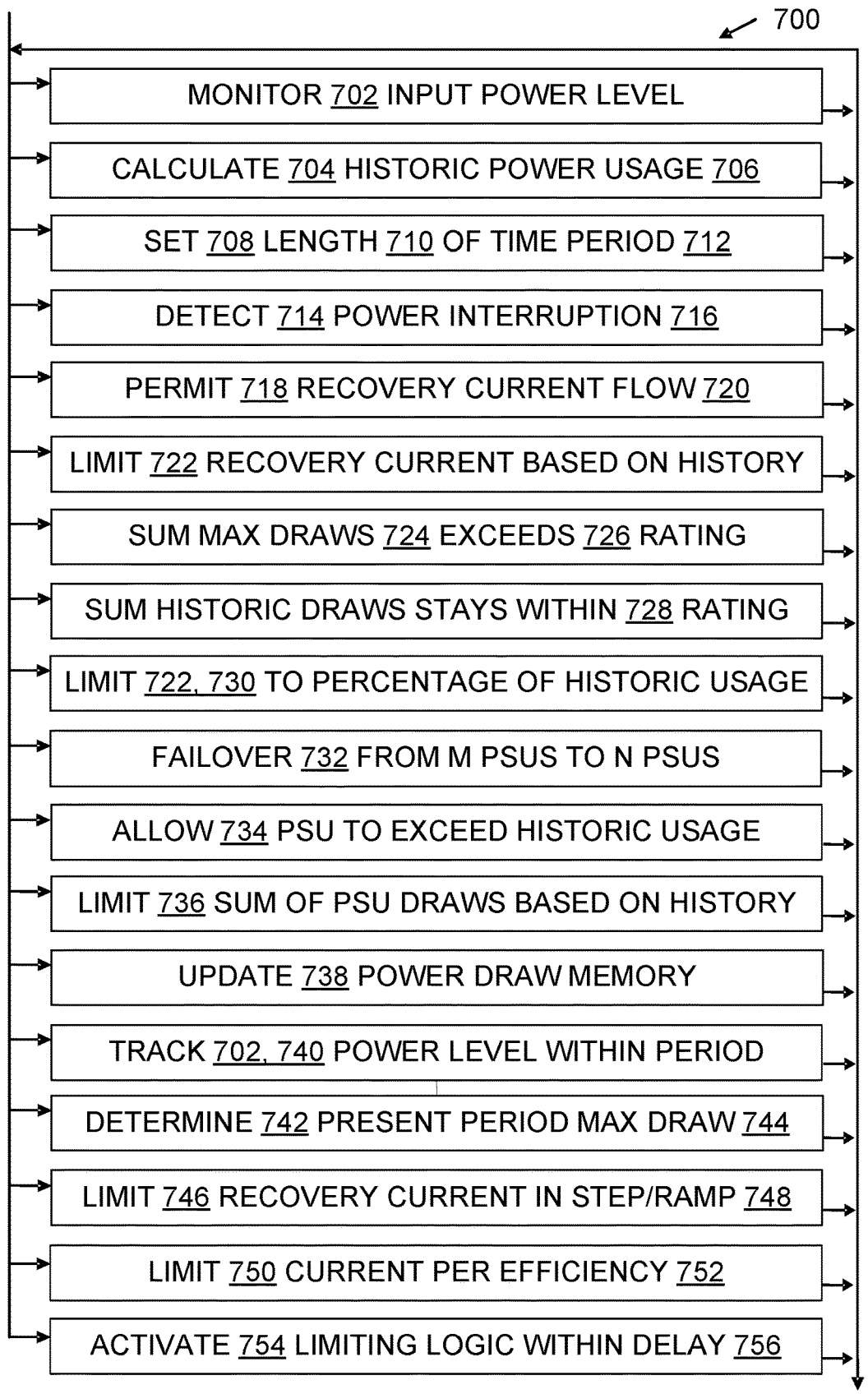
FIG. 7 is flowchart further illustrating aspects of some processes for use with recovery current limitation technology.

FIG. 7 illustrates some process and configured storage media embodiments in a flowchart 700. Technical processes shown in the Figures or otherwise disclosed will typically be performed automatically, e.g., by a PSU 300, a PSU 400, or a PSU 610. Some steps may sometimes be triggered manually, e.g., in diagnostic or testing situations. In a given embodiment zero or more illustrated steps of a process may be repeated, perhaps with different parameters or data to operate on. Steps in an embodiment may also be done in a different order than the top-to-bottom order that is laid out in FIG. 7. Steps may be performed serially, in a partially overlapping manner, or fully in parallel. The order in which flowchart 700 is traversed to indicate the steps performed during a process may vary from one performance of the process to another performance of the process. The flowchart traversal order may also vary from one process embodiment to another process embodiment. Steps may also be omitted, combined, renamed, regrouped, or otherwise depart from the illustrated flow, provided that the process performed is operable and conforms to at least one claim.

Some embodiments provide or use a method of dynamically limiting total recovery current in a power infrastructure. One example includes monitoring 702 an input power level at each of a plurality of power supply units (PSUs) which are electrically connected to the power infrastructure. In general, for any embodiment that monitors input power level there is at least one equivalent (so far as limitation results are concerned) embodiment which monitors 702 output power load. This example method also includes periodically calculating 704 for each of the PSUs a historic power usage level 706 over a recent time period 712 which has a predetermined length 710 previously set 708 either as a default or by an administrator, for instance. In some situations, the recent time period 712 which is used in periodically calculating 704 the historic power usage level for the PSU has a predetermined length 710 in the range from 30 to 90 minutes. After detecting 714 an interruption 716 of power to one or more of the PSUs, this method permits 718 recovery currents to flow 720 through the power infrastructure to recovering PSUs while limiting 722 the recovery currents based on the respective historic power usage levels of the recovering PSUs.

In some examples, each of the PSUs has a respective maximum continuous output wattage rating and a corresponding maximum continuous draw 724, the power infrastructure has a recovery power load rating, and the sum of maximum continuous draws of the PSUs connected to the power infrastructure exceeds 726 the recovery power load rating of the power infrastructure. For instance, in some situations the sum of maximum continuous draws of the PSUs connected to the power infrastructure is at least 1.5 times the recovery power load rating of the power infrastructure. In some situations, the sum of maximum continuous draws of the PSUs connected to the power infrastructure is at least four times the recovery power load rating of the power infrastructure. However, the sum of the historic power usage levels of the PSUs connected to the power infrastructure does not exceed (i.e., stays within) 728 the recovery power load rating of the power infrastructure. Thus, without history-based input power limiting the PSUs would exceed the infrastructure's capacity on recovery after a power drop out, but with history-based power limiting as taught herein, they do not exceed the infrastructure's capacity.

In some examples, limiting 722 the recovery currents based on the respective historic power usage levels of the recovering PSUs includes percentage-based limiting 730 wherein a PSU limits its own recovery current to a value which is between 130% and 160% of the most recently calculated historic power usage level of the PSU.

In some examples, the system fails over 732 from M PSUs to N PSUs, where N is less than M. In some cases, permitting 718 recovery currents to flow through the power infrastructure to recovering PSUs to accomplish failover includes allowing 734 at least one of the N PSUs to draw a recovery current which exceeds that PSU's historic power usage level. If every PSU were allowed to exceed its historic usage, then the benefits such as smaller infrastructure capacity would be reduced or eliminated, so a condition is imposed, namely, limiting 722 the recovery currents based on the respective historic power usage levels of the recovering PSUs involves limiting 736 the recovery currents to the N PSUs to yield a total recovery current which does not exceed the total historic power usage levels of the M PSUs.

Configured Media

Some embodiments include a configured computer-readable storage medium 112. Medium 112 may include disks (magnetic, optical, or otherwise), RAM, EEPROMS or other ROMs, and/or other configurable memory, including in particular computer-readable media (which are not mere propagated signals). The storage medium which is configured may be in particular a removable storage medium 114 such as a CD, DVD, or flash memory. A general-purpose memory, which may be removable or not, and may be volatile or not, can be configured into an embodiment using items such as a firmware controlling update logic 308, and firmware controlling current limiting logic 312, in the form of data 118 and instructions 116, read from a removable medium 114 and/or another source such as a network connection, to form a configured medium. The configured medium 112 is capable of causing a power supply system to perform technical process steps for dynamic power limitation or dynamic current limitation based on historic usage, as disclosed herein. The Figures thus help illustrate configured storage media embodiments and process embodiments, as well as system and process embodiments. In particular, any of the process steps illustrated in FIG. 6, FIG. 7, or otherwise taught herein, may be used to help configure a storage medium to form a configured medium embodiment.

Some Additional Combinations and Variations

Examples are provided herein to help illustrate aspects of the technology, but the examples given within this document do not describe all of the possible embodiments. Embodiments are not limited to the specific implementations, arrangements, sequences, flows, features, approaches, or scenarios provided herein. A given embodiment may include additional or different technical features, mechanisms, or data structures, for instance, and may otherwise depart from the examples provided herein.

Any of the combinations of code, data structures, logic, components, communications, and/or their functional equivalents described herein may also be combined with any of the systems and their variations described herein. A process may include any steps described herein in any subset or combination or sequence which is operable. Each variant may occur alone, or in combination with any one or more of the other variants. Each variant may occur with any of the processes and each process may be combined with any one or more of the other processes. Each process or combination of processes, including variants, may be combined with any of the medium combinations and variants describe above.

CONCLUSION

Although particular embodiments are expressly illustrated and described herein as processes, as configured media, or as systems, it will be appreciated that discussion of one type of embodiment also generally extends to other embodiment types. For instance, the descriptions of processes in connection with FIGS. 6 and 7 also help describe configured media, and help describe the technical effects and operation of systems and manufactures like those discussed in connection with other Figures. It does not follow that limitations from one embodiment are necessarily read into another. In particular, processes are not necessarily limited to the data structures and arrangements presented while discussing systems or manufactures such as configured memories.

Those of skill will understand that implementation details may pertain to specific code, such as specific APIs, specific fields, and specific sample programs, and thus need not appear in every embodiment. Those of skill will also understand that program identifiers and some other terminology used in discussing details are implementation-specific and thus need not pertain to every embodiment. Nonetheless, although they are not necessarily required to be present here, such details may help some readers by providing context and/or may illustrate a few of the many possible implementations of the technology discussed herein.

Reference herein to an embodiment having some feature X and reference elsewhere herein to an embodiment having some feature Y does not exclude from this disclosure embodiments which have both feature X and feature Y, unless such exclusion is expressly stated herein. All possible negative claim limitations are within the scope of this disclosure, in the sense that any feature which is stated to be part of an embodiment may also be expressly removed from inclusion in another embodiment, even if that specific exclusion is not given in any example herein. The term "embodiment" is merely used herein as a more convenient form of "process, system, article of manufacture, configured computer readable medium, and/or other example of the teachings herein as applied in a manner consistent with applicable law." Accordingly, a given "embodiment" may include any combination of features disclosed herein, provided the embodiment is consistent with at least one claim.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific technical effects or technical features of an example may be omitted, renamed, grouped differently, repeated, instantiated in hardware and/or software differently, or be a mix of effects or features appearing in two or more of the examples. Functionality shown at one location may also be provided at a different location in some embodiments; one of skill recognizes that functionality modules can be defined in various ways in a given implementation without necessarily omitting desired technical effects from the collection of interacting modules viewed as a whole.

Reference has been made to the figures throughout by reference numerals. Any apparent inconsistencies in the phrasing associated with a given reference numeral, in the figures or in the text, should be understood as simply broadening the scope of what is referenced by that numeral. Different instances of a given reference numeral may refer to different embodiments, even though the same reference numeral is used. Similarly, a given reference numeral may be used to refer to a verb, a noun, and/or to corresponding instances of each, e.g., a processor 110 may process 110 instructions by executing them.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims and the abstract, as filed, are part of the specification.

While exemplary embodiments have been shown in the drawings and described above, it will be apparent to those of ordinary skill in the art that numerous modifications can be made without departing from the principles and concepts set forth in the claims, and that such modifications need not encompass an entire abstract concept. Although the subject matter is described in language specific to structural features and/or procedural acts, it is to be understood that the subject matter defined in the appended claims is not necessarily limited to the specific technical features or acts described above the claims. It is not necessary for every means or aspect or technical effect identified in a given definition or example to be present or to be utilized in every embodiment. Rather, the specific features and acts and effects described are disclosed as examples for consideration when implementing the claims.

All changes which fall short of enveloping an entire abstract idea but come within the meaning and range of equivalency of the claims are to be embraced within their scope to the full extent permitted by law.

What is claimed is:

1. A power supply unit (PSU) which dynamically limits total recovery current, comprising:
   a power input;
   a power output;
   a memory configured by power draw data residing in the memory;
   an update logic which in operation determines a level of power drawn by the PSU from a power infrastructure, and updates a power draw data value in the memory based on an input power level or an output load level or both; and
   a recovery current limiting logic which in operation after an interruption of power to the PSU permits a recovery current to flow from the power infrastructure through the PSU power output while limiting the recovery current based on the power draw data value residing in the memory.

2. The power supply unit of claim 1, wherein the update logic tracks the input power level at the PSU power input within a given time period thereby determining a present period maximum power draw value, wherein the present period maximum power draw value is less than the power draw data value for a given period, and wherein the update logic lowers the power draw data value residing in the memory to match the present period maximum power draw value.

3. The power supply unit of claim 1, wherein the power supply unit has a rated maximum draw M, and a conversion efficiency E, and wherein the power draw data value is such that the recovery current limiting logic limits the recovery current flowing through the power output to a value that is no greater than 70 percent of M times E.

4. The power supply unit of claim 1, in combination with a plurality of other power supply units each of which also has a respective power input, power output, memory containing power draw data, update logic, and recovery current limiting logic, wherein the power supply units draw power from a power infrastructure which has a maximum rated capacity, wherein each power supply unit has a respective rated maximum draw, wherein the sum of the power supply unit rated maximum draws exceeds the maximum rated capacity of the power infrastructure, and wherein the sum of the power amounts drawn when each power supply unit limits recovery current based on its respective power draw data value does not exceed the maximum rated capacity of the power infrastructure.

5. The power supply unit of claim 1, wherein the recovery current limiting logic is activated in the power supply unit and the limited recovery current begins to flow quickly enough after the interruption of power starts to prevent a loss of data in a digital device that is powered by the power supply unit.

6. The power supply unit of claim 1, wherein the recovery current limiting logic permits limited recovery current to flow from the power infrastructure through the PSU in a stepped manner, namely, at a first power rate for a first time period and then at a second and greater power rate for a subsequent second time period.

7. A power supply system which dynamically limits total recovery current, comprising:
at least one power supply unit (PSU), the PSU comprising:
a power input;
a power output;
a resettable period timer having a full period of predetermined length;
a power draw register which in operation represents power drawn by the PSU from a power infrastructure during a recent period;
a present period maximum power draw register which in operation represents the maximum power drawn by the PSU from the power infrastructure after a most recent update to the power draw register;
one or more register update logics which in operation (a) collectively determine a level of power drawn by the PSU from a power infrastructure based on an input power level at the PSU power input or an output load level at the PSU power output or both, (b) update the present period maximum power draw register based on the determined power level, (c) update the power draw register based on the determined power level and reset the period timer when the determined power level exceeds a value in the power draw register, and (d) reset the period timer and update the power draw register based on the present period maximum power draw register after the power draw register exceeds the present period maximum power draw register; and
a recovery current limiting logic which in operation after an interruption of power to the PSU permits a recovery current to flow from the power infrastructure through the PSU while limiting the recovery current based on the power draw register.

8. The power supply system of claim 7, wherein the PSU is configured to operate differently depending on the length of the power interruption, in that the recovery current limiting logic operates when the length of the power interruption is less than a predetermined value X, but when the length of the power interruption is greater than X the PSU performs a soft start without operating the recovery current limiting logic.

9. The power supply system of claim 7, wherein the recovery current limiting logic is activated in the PSU only when the interruption of power to the PSU lasts for less than X milliseconds, where X is a value such that the power system can switch from main power to battery power through the PSU in less than X milliseconds without causing a loss of data in a digital device that is powered by the PSU.

10. The power supply system of claim 7, wherein the recovery current limiting logic begins permitting the limited recovery current to flow from the power infrastructure through the PSU within less than 100 milliseconds after the interruption of power begins.

11. The power supply system of claim 7, wherein the recovery current limiting logic permits limited recovery current to flow from the power infrastructure through the PSU at a plurality of ramped power rates.

12. The power supply system of claim 7, wherein the power supply system comprises at least ten thousand PSUs, each PSU comprising a respective resettable period timer, a respective power draw register, a respective present period maximum power draw register, one or more respective register update logics, and a respective recovery current limiting logic.

13. The power supply system of claim 7, wherein the power supply system comprises the power infrastructure, wherein the power infrastructure provides power to servers in at least a portion of a datacenter, and wherein the power supply system comprises at least one thousand PSUs that are connected to the power infrastructure to power the servers, each PSU comprising a respective resettable period timer, a respective power draw register, a respective present period maximum power draw register, one or more respective register update logics, and a respective recovery current limiting logic.

14. A method of dynamically limiting total recovery current in a power infrastructure, comprising:
calculating, for each of a plurality of power supply units (PSUs) which are electrically connected to the power infrastructure, a historic power usage level over a recent time period which has a predetermined length; and
after an interruption of power to one or more of the PSUs, permitting recovery currents to flow through the power infrastructure to recovering PSUs while limiting the recovery currents based on the respective historic power usage levels of the recovering PSUs.

15. The method of claim 14, wherein:
each of the PSUs has a respective maximum continuous output wattage rating and a corresponding maximum continuous draw;
the power infrastructure has a recovery power load rating;
the sum of maximum continuous draws of the PSUs connected to the power infrastructure exceeds the recovery power load rating of the power infrastructure; and
the sum of the historic power usage levels of the PSUs connected to the power infrastructure does not exceed the recovery power load rating of the power infrastructure.

16. The method of claim 15, wherein the sum of maximum continuous draws of the PSUs connected to the power infrastructure is at least 1.5 times the recovery power load rating of the power infrastructure.

17. The method of claim 14, further comprising activating current limiting logic in a particular PSU upon booting the PSU.

18. The method of claim 14, wherein limiting the recovery currents based on the respective historic power usage levels of the recovering PSUs comprises a PSU limiting its own recovery current to a value which is between 130% and 160% of the most recently calculated historic power usage level of the PSU.

19. The method of claim 14, wherein a recent time period which is used in calculating a historic power usage level for a PSU has a predetermined length in the range from 30 to 90 minutes.

20. The method of claim 14, further comprising failing over from M PSUs to N PSUs, where N is less than M, and wherein permitting recovery currents to flow through the power infrastructure to recovering PSUs comprises allowing at least one of the N PSUs to draw a recovery current which exceeds that PSU's historic power usage level, and wherein limiting the recovery currents based on the respective historic power usage levels of the recovering PSUs comprises limiting the recovery currents to the N PSUs to yield a total recovery current which does not exceed the total historic power usage levels of the M PSUs.

* * * * *